Patented Apr. 4, 1944

2,346,000

UNITED STATES PATENT OFFICE 2,346,000

STILBENE DERIVATIVES

Harry James Barber, Gidea Park, Romford, England, assignor to May & Baker Limited, Dagenham, Essex, England, a British company No Drawing. Application March 12, 1942, Serial No. 434,395. In Great Britain January 1, 1941

7 Claims. (Cl. 260—649)

The present invention is for improvements in or relating to the manufacture of stilbene derivatives and has for its object the preparation of stilbene derivatives of the type:

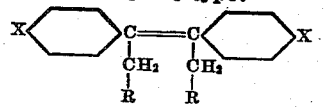

in which X represents a halogen atom and R represents a hydrogen atom or a hydrocarbon group e. g. an alkyl, aralkyl or aryl group (preferably an alkyl group). These compounds are useful as intermediates for the preparation of therapeutically useful products.

According to one feature of the present invention, a process for the preparation of stilbene derivatives having the general formula given above, comprises reacting with halogen a diphenyl ethane derivative of the general formula:

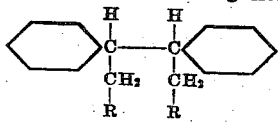

(wherein R has the significance above defined) to produce a tetrahalogen derivative, reducing the tetrahalogen derivative, treating the product with halogen acid and splitting off from the trihalogen compound thus formed the elements of halogen acid to form the desired stilbene homologue.

The course of reaction is thought to follow the scheme set out below:

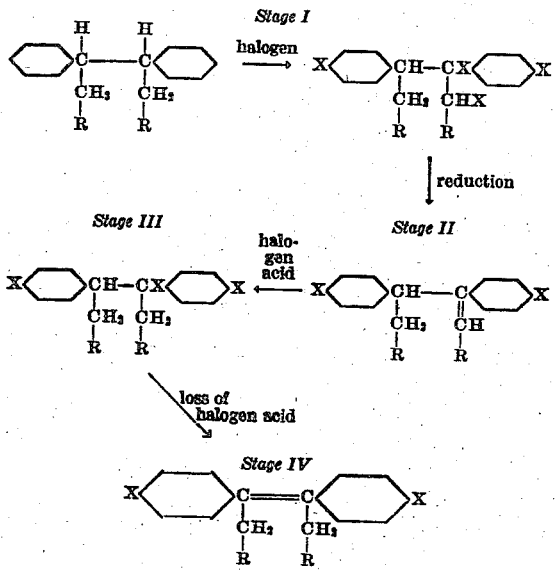

It is to be understood that the reaction scheme as set out above indicates merely what is believed to take place. Thus, for example, it is possible that in Stage I the two halogen atoms which enter the alkane chain may occupy the $\beta,\gamma$-positions instead of the $\alpha,\beta$ positions as indicated.

In carrying the present invention into effect, it is preferred to employ bromine in the step of tetra-halogenation (Stage I) although other halogens might be employed. Conveniently, the reaction is effected at elevated temperature in the presence of acetic acid. As is apparent from the foregoing scheme, two atoms of the halogen enter into the 4:4'-positions of the benzene nuclei, while the other two enter into the alkane chain to give compounds believed to be of the styrol di-halide type. For Stage II, any of the commonly known reducing agents may be employed in the reduction of the tetra halogen compound, but the preferred procedure is, with the tetra halogen compound suspended in acetic acid, to add zinc dust to the hot suspension and, the reaction being exothermic, to allow the temperature to reach boiling point. It is not essential that the reduction product shall be isolated since, as will be described in detail hereinafter, prolonged reduction results, it is thought, automatically in the reaction passing consecutively through Stages III and IV, and in any event results in the production of the final product i. e. desired stilbene derivative.

The product of Stage II readily takes up one molecule of hydrogen halide (preferably hydrogen bromide) to form a tri-halide of the formula given above. When, for example, hydrogen bromide is employed, the product from Stage II is preferably dissolved in an excess of dry chloroform or other suitable inert organic solvent and saturated with the dry hydrogen bromide at low temperature, the reaction mixture being allowed to attain room temperature for some hours, whereafter the solvent is removed at low temperature. The product of Stage III thus formed readily loses the elements of halogen acid to give the desired stilbene derivative. This reaction step may conveniently be carried out by heating rapidly the tri-bromide (product of Stage III), maintaining the temperature until all of the halogen acid is evolved. It is essential that the decomposition be rapid and at as low a temperature as possible.

It has been found that the nature of the product of the reduction step (Stage II) depends upon the conditions of reaction. Specifically, when the period of the reaction is prolonged the compound indicated above as the product of Stage II is presumably first formed in situ and then undergoes conversion into the final product, i. e. the desired stilbene derivative. Thus, using zinc dust in glacial acetic acid with the reaction temperature at boiling point (118° C.) it was found that, with addition of the zinc dust in one portion of 10 grms.

of the tetrabromo compound in the presence of 250 ccs. of glacial acetic acid, reduction was complete (as shown by complete dissolution of the tetrabromo compound) in not more than ten minutes and the product isolated was a compound of the formula given above for the product of Stage II. When, however, the zinc dust was added in small portions over a period of 5 to 10 minutes and reduction carried out for a somewhat longer period of time than before (when as before complete dissolution of the tetra-bromo compound is effected), the product separated was the desired final product i. e. a stilbene derivative. Accordingly, a further feature of the present invention comprises reacting with halogen a di-phenyl ethane derivative of the said general formula to produce a tetrahalogen compound and reducing the tetrahalogen compound under such conditions that the product isolated is the desired stilbene homologue.

The process of the present invention is illustrated by the following non-limitative examples:

Example I

*Stage I.*—50 grms. of β-γ-diphenyl-n-butane (liquid racemic form or meso solid form) were boiled for several hours with 500 cc. of acetic acid, 60 cc. of bromine and 20 cc. of water. The required 4:4'-α-β-tetrabromo-β-γ-diphenyl-n-butane separated in a pure condition and in the form of heavy prismatic crystals having a decomposition point 170–180° C.

*Stage II.*—50 grms. of the above tetrabromo compound were suspended in 250 cc. of glacial acetic acid and reduced with 10 grms. of zinc dust at 118° C. The reduction was rapid and was complete when all the tetrabromide in suspension had disappeared. The product, β-γ-di(p-bromophenyl)-n-butene-1, was obtained by decanting from unchanged zinc dust and pouring into water. It may be purified by crystallisation from alcohol from which it forms colourless prisms, M. Pt. 90–92° C.

*Stage III.*—The product from Stage II was dissolved in 3–4 volumes of dry chloroform and saturated with dry hydrogen bromide at 0° C. After a few hours at room temperature the solvent was removed at low temperature, and the residual crystalline-β-bromo-β-γ-di(p-bromophenyl)n-butane purified by crystallising from glacial acetic acid. Its decomposition point which varies with the rate of heating lies between 90° and 120° C.

*Stage IV.*—The tri-bromide so obtained was heated rapidly until decomposition set in and the temperature was maintained until all the HBr had been evolved. It is essential for the success of this operation that the decomposition be rapid and at as low a temperature as possible. The product 4:4'-dibromo-α-β-dimethyl-stilbene which solidifies rapidly can be purified by crystallisation from acetic acid or other suitable solvents, M. Pt. 125° C.

Example II 50 grms. of 4:4'-α-β-tetrabromo-β-γ-diphenyl-n-butane prepared as in Example I were suspended in 250 ccs. of glacial acetic acid and reduced with 10 grms. of zinc dust added in small portions over a period of 5–10 minutes. The addition of zinc dust was effected with the suspension heated to a temperature of about 100° C. whereafter the temperature rose to 118° C. (boiling point) due to heat of reaction. The reduction was rapid, and complete when all the tetra-bromide in suspension had disappeared, whereafter the reaction mixture was boiled for a further five minutes. The product 4:4'-dibromo-α-β-dimethyl stilbene was obtained by decanting the hot solution from unchanged zinc dust and crystallising out by cooling. Purification was effected by recrystallisation as in Example I.

The corresponding diethyl compound may be similarly prepared.

I claim:

1. Stilbene derivatives of the general formula:

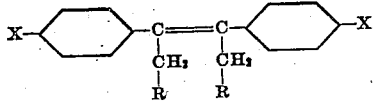

wherein X represents a halogen atom and R represents an alkyl radical.

2. Stilbene derivatives of the general formula:

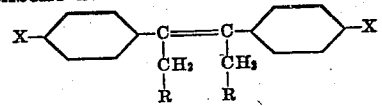

wherein X represents a bromine atom and R represents a lower alkyl radical.

3. The compound having the formula:

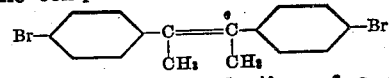

4. Process for the production of a stilbene derivative of the formula

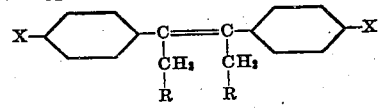

in which X represents a halogen atom and R is a member selected from the group consisting of a hydrogen atom and an alkyl radical, which comprises heating a diphenylethane derivative of the formula

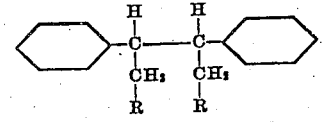

in which R has the aforesaid value, with halogen in the presence of acetic acid, separating the resulting tetrahalogen product from the reaction mixture, removing the alkane halogen with a reducing agent in the presence of acetic acid, treating the resulting reaction mixture with hydrohalic acid, heating the resulting product until all the hydrohalic acid is evolved, and then separating the stilbene derivative.

5. Process for the production of 4:4'-dibromo-α-β-dimethyl-stilbene which comprises heating β-gamma-diphenyl-n-butane with acetic acid and bromine, separating the resulting 4:4'-α-β-tetrabromo-β-gamma-diphenyl-n-butane from the reaction mixture, removing the alkane halogen from the tetrabromo compound with zinc dust in the presence of glacial acetic acid, mixing the reaction product with an inert organic solvent and saturating the resulting mixture with hydrogen bromide at low temperature, removing the solvent from the mixture, rapidly heating the residue until all the hydrogen bromide is evolved, and then extracting the 4:4'-dibromo-α-β-dimethyl-stilbene.

6. Process for the production of a stilbene derivative of the formula

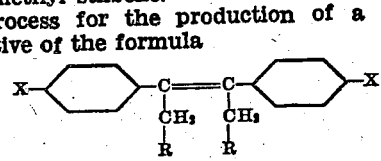

in which X represents a halogen atom and R is a member selected from the group consisting of a hydrogen atom and an alkyl radical which comprises removing the alkane halogen from a compound of the formula

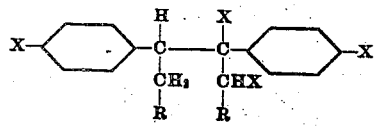

in which X and R have the aforesaid values, by means of a reducing agent in the presence of acetic acid, heating the reaction mixture, and separating therefrom the stilbene derivative.

7. Process for the production of 4:4'-dibromo-$\alpha$-$\beta$-dimethyl-stilbene which comprises reducing 4:4' - $\alpha$ - $\beta$ - tetrabromo - $\beta$-gamma-diphenyl-n-butane with zinc dust in the presence of glacial acetic acid with heat, boiling the reaction mixture, and separating the 4:4'-dibromo-$\alpha$-$\beta$-dimethyl-stilbene.

HARRY JAMES BARBER.